March 18, 1930.  R. W. H. FOX  1,751,315
COCKTAIL SHAKER
Filed June 21, 1926
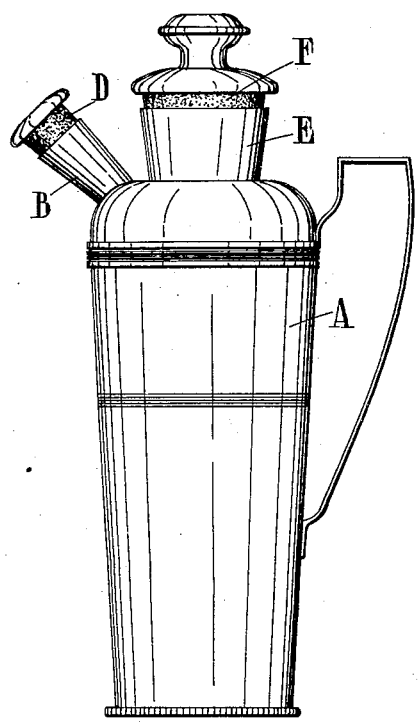
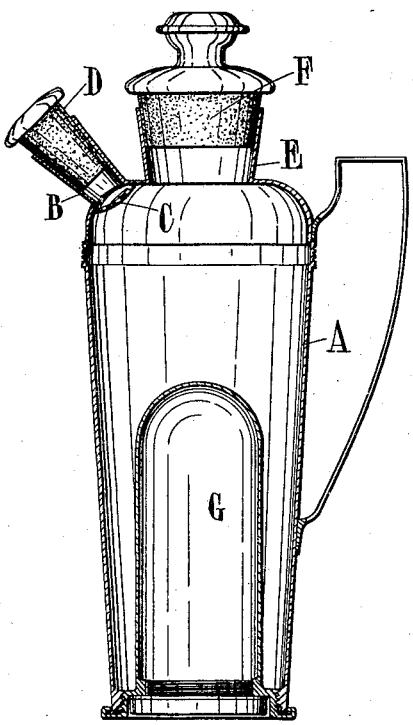
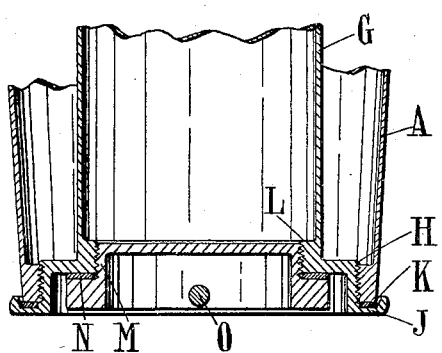
INVENTOR
Richard W. H. Fox
BY
ATTORNEY Patented Mar. 18, 1930

1,751,315

UNITED STATES PATENT OFFICE

RICHARD WILLIAM HENRY FOX, OF PALMERS GREEN, ENGLAND

COCKTAIL SHAKER

Application filed June 21, 1926. Serial No. 117,507, and in Great Britain March 29, 1926.

This invention relates to the vessels of the kind usually known as cocktail shakers, i. e. shakers or mixers for cocktails, and consisting of a vessel adapted to receive a mixture of liquids and ice and provided with means whereby the outlet and inlet may be closed to prevent escape of the liquid during the shaking of the same with the ice for the purpose of cooling such liquid.

In the cocktail shakers heretofore employed, the ice has been brought into direct contact with the liquid, so that the water resulting from the melting of the ice mixes with the liquid to be cooled. This arrangement is subject to the disadvantage that the ice itself may become soiled in transit to the place where it is to be used and so causes the liquid to be also soiled, or the ice may even be itself contaminated by reason of its having been formed from contaminated water.

In order to obviate these disadvantages, according to my invention the mixture of liquids forming the cocktail is cooled by means of ice which does not come into contact therewith. For this purpose, the ice is enclosed in a vessel, the interior of which is isolated from the interior space of the cocktail shaker proper and which is formed of a metal of good thermal conductivity, for example, silver plated copper or silver, such vessel extending into the interior space of the cocktail shaker and preferably having a large surface through which heat-interchange between the beverage and the ice can take place, for example, the walls of the ice container may be corrugated either longitudinally or transversely.

For example, the ice container may extend upwards concentrically from the bottom of the cocktail shaker. In this case the bottom of the cocktail shaker is made detachable, e. g. in the form of a plug or cap screwed into or on to the open bottom of the cocktail shaker. The ice container may be made with a collar or flange thereon, which is adapted to screw into or on to the bottom of the cocktail shaker. The above arrangement of the ice container is especially advantageous for use with cocktail shakers of the jug type wherein the upper part is not detachable, since it enables the whole interior space of the vessel to be opened and thus permits thorough cleansing thereof, which is not possible with the arrangements heretofore adopted. It may however be employed with cocktail shakers of other types.

It is obvious that the ice containing vessel may form the lid or stopper of the cocktail shaker. In such cases, the ice containing vessel is adapted to extend down into the body of the cocktail shaker and be immersed in the liquid therein, when the said lid or stopper, or the upper part of the shaker, is in position.

In the accompanying drawings, I have shown how my said invention may be conveniently and advantageously carried into practice. In these drawings:

Figure 1 is a side elevation;
Figure 2 a vertical central section, and
Figure 3 a detail view drawn to an enlarged scale also in vertical central section.

A is the main vessel or cocktail shaker proper provided with a lateral spout B protected by an internal perforated plate C and having a cork or stopper D. E is the main inlet or mouth of the shaker adapted to be closed by a cork or stopper F.

The ice-containing vessel G is formed with a stepped flange, the cylindrical part H of which is screw-threaded and engages a corresponding screw-thread in the open bottom of the vessel A, whilst the radial flange J is provided with an annular recess to receive packing K against which the lower edge of the side wall of the vessel A presses when the screw H is screwed up, so as to form a fluid tight joint.

The ice-container G is provided with a screw-threaded mouth L, which is adapted to be closed by a screw-threaded stopper M and a packing ring N, the stopper being made hollow and having an internal cross-bar or handle O, whereby it may be readily turned.

With this arrangement, the ice-container G need only be removed when it is necessary to clean the interior of the vessel A, the ice being introduced and the water of condensation removed on withdrawal of the stopper M only. Moreover any water of condensation that may leak out past the stopper cannot reach the beverage in the interior of the vessel A.

What I claim is:—

A cocktail shaker including a beverage-containing vessel having its lower end formed as an internally threaded flange, a refrigerant-containing chamber having a stepped cylindrical part forming an orifice, the outer surface of said stepped cylindrical part being threaded to screw into the threads of the flange at the lower end of the beverage-containing vessel, the upper ends of the threaded flange and the stepped cylindrical part together forming the bottom of the beverage-containing vessel, and a closure fitting into the orifice of the reduced stepped cylindrical part and having its outer face within the plane of the outer face of said stepped cylindrical part.

RICHARD WILLIAM HENRY FOX.